US 11,589,707 B2

(12) United States Patent
Riggle

(10) Patent No.: US 11,589,707 B2
(45) Date of Patent: Feb. 28, 2023

(54) BELTED FOOD WARMING ASSEMBLY

(71) Applicant: Star Manufacturing International, Inc., Smithville, TN (US)

(72) Inventor: Gary G. Riggle, Cookeville, TN (US)

(73) Assignee: STAR MANUFACTURING INTERNATIONAL, INC., Smithville, TN (US)

( * ) Notice: Subject to any disclaimer, the term of this patent is extended or adjusted under 35 U.S.C. 154(b) by 643 days.

(21) Appl. No.: 16/601,191

(22) Filed: Oct. 14, 2019

(65) Prior Publication Data
US 2020/0129007 A1    Apr. 30, 2020

Related U.S. Application Data

(60) Provisional application No. 62/753,464, filed on Oct. 31, 2018.

(51) Int. Cl.
| | |
|---|---|
| A47J 37/04 | (2006.01) |
| A47J 36/24 | (2006.01) |
| A47J 37/08 | (2006.01) |
| A21D 8/06 | (2006.01) |
| A47J 37/06 | (2006.01) |
| B30B 3/02 | (2006.01) |
| A21C 11/00 | (2006.01) |

(52) U.S. Cl.
CPC ............ *A47J 37/042* (2013.01); *A21D 8/06* (2013.01); *A47J 36/24* (2013.01); *A47J 37/044* (2013.01); *A47J 37/047* (2013.01); *A47J 37/0611* (2013.01); *A47J 37/0857* (2013.01); *A21C 11/008* (2013.01); *B30B 3/02* (2013.01)

(58) Field of Classification Search
CPC .......... A21B 1/42; A21D 8/06; A21C 11/006; A21C 11/008; B30B 3/02; B30B 3/005; A47J 37/0611; A47J 2037/0617
USPC .................... 99/349, 353; 426/512, 517, 456
See application file for complete search history.

(56) References Cited

U.S. PATENT DOCUMENTS

| | | | | |
|---|---|---|---|---|
| 2,812,729 A | * | 11/1957 | Bahlsen ................... | A21B 5/02 99/443 C |
| 4,446,159 A | * | 5/1984 | Roth ....................... | A23L 13/67 426/802 |
| 5,683,734 A | * | 11/1997 | Israel ..................... | A21C 11/08 426/496 |
| 5,983,785 A | | 11/1999 | Schreiner et al. | |
| 7,332,189 B2 | * | 2/2008 | Mihalos .................. | A23L 7/117 426/549 |

(Continued)

FOREIGN PATENT DOCUMENTS

| | | | | |
|---|---|---|---|---|
| EP | 1391279 A2 | * | 2/2004 | ............... B27N 3/26 |
| GB | 1 480 964 | | 7/1977 | |

OTHER PUBLICATIONS

Written Opinion for PCT/US19/30159, dated Jun. 20, 2019, 8 pp.
(Continued)

*Primary Examiner* — Reginald Alexander
(74) *Attorney, Agent, or Firm* — Crowell & Moring LLP; John C. Freeman

(57) ABSTRACT

A belted food warmer assembly is disclosed that includes a housing containing a heated rotating drum, a belt roller, and a belt. The belt is draped over a portion of the heated rotating drum and is configured to hold a flexible food product against the heated drum as the food product rotates with the heated drum.

23 Claims, 3 Drawing Sheets

(56) References Cited

U.S. PATENT DOCUMENTS

| | | |
|---|---|---|
| 8,685,480 B2 * | 4/2014 | Fredlund ................ A23L 19/18 426/456 |
| 9,516,883 B1 | 12/2016 | Huegerich et al. |
| 2001/0001462 A1 | 5/2001 | Chandler et al. |
| 2010/0209578 A1 | 8/2010 | Fredlund |
| 2014/0199446 A1 | 7/2014 | Hueerich |
| 2021/0169268 A1 * | 6/2021 | Vazquez Aguilera ....................... A47J 37/0611 |

OTHER PUBLICATIONS

International Search Report for PCT/US19/30159, dated Jun. 20, 2019, 2 pp.

Star Manufacturing International Inc., Star® Rolling Tortilla Warmer Owner's Manual, Models RTW14EA and RTW19EA, 2M-Z19213-Rev. G-08.2018, 24 pages.

* cited by examiner

BELTED FOOD WARMING ASSEMBLY

CROSS-REFERENCE TO RELATED APPLICATIONS

This application claims priority from U.S. Provisional Application No. 62/753,464, filed on Oct. 31, 2018, the entirety of which is hereby fully incorporated by reference herein.

BACKGROUND

The present disclosure relates generally to food warming assemblies, and more particularly, to a belted food warming assembly with a rotating heated drum.

SUMMARY

A food warmer assembly with a housing, a cylindrically shaped heating drum rotatably mounted within the housing, the heating drum having an outer circumferential surface, a belt roller rotatably mounted within the housing and disposed substantially parallel to the heating drum, wherein the belt roller is movably spaced apart from the heating drum circumferential surface, and a belt looped around the belt roller, wherein the belt is disposed over a top portion of the heating drum circumferential surface and a back portion of the heating drum circumferential surface.

A method for warming a flexible food product including the steps of inserting the food product between a belt and a cylindrically shaped heating drum, wherein the belt is looped around a rotatable belt roller that is movable spaced apart from the heating drum; rotating the heating drum to pull the food product along a top exterior circumferential surface of the heating drum; moving the food product along the heating drum exterior circumferential surface as the heating drum rotates while the food product remains disposed between the heating drum exterior circumferential surface and an exterior surface of the belt; holding the food product against the heating drum exterior circumferential surface by the weight of the belt causing the exterior surface of the belt to maintain contact with the food product; heating an interior of the heating drum with a heater; and warming the food product as it contacts the heating drum exterior circumferential surface.

DETAILED DESCRIPTION

This application hereby incorporates by reference U.S. Pat. No. 9,516,883, entitled "Heating Assembly and Method for Tortilla Like Food."

Figure 1:
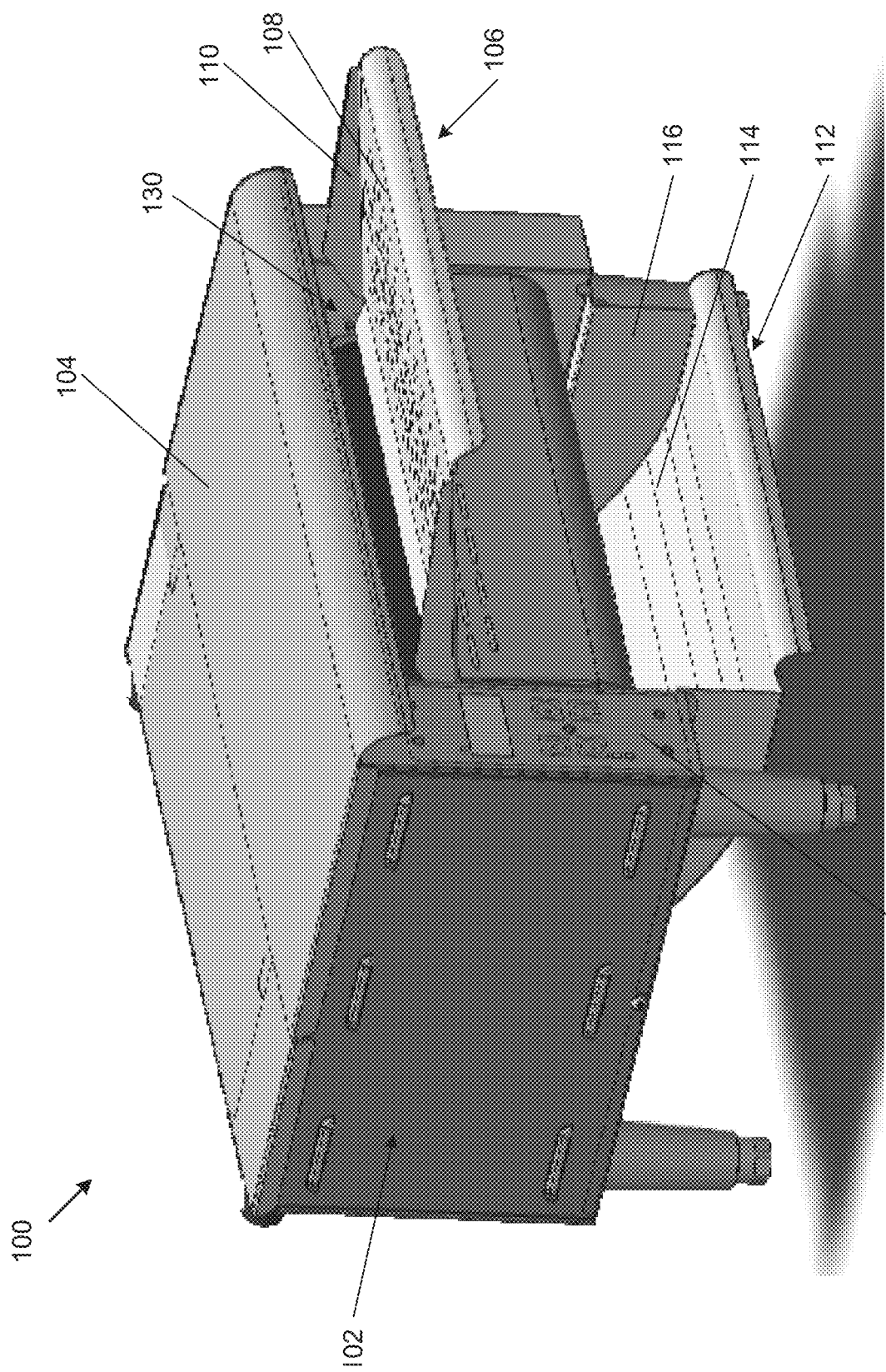
FIG. 1 is an isometric view of an embodiment of a warming assembly.

Referring now to the figures, a warming assembly 100 for thin bread-like food, such as tortilla, crepes, pita bread, flatbread, thin pancake, and like food, is shown in FIG. 1. Such bread-like food is flexible and malleable, and may have a thickness of ¼ inch or less. Such food further has a first surface and an oppositely facing second surface. The surfaces can lie flat on a flat surface or bend to fit the contour of a surface against which it is pressed. For the sake of simplicity, during the following disclosure, this type of food is referred to as a "food product."

The warming assembly 100 may be a stand-alone unit configured to be placed on a flat surface, such as a shelf or counter, or may be configured to be placed within an array of food preparation devices within a kitchen. Warming assembly 100 may include a housing 102 that may be substantially rectangular, as shown in FIG. 1, or that may be any other shape suitable to enclose warming assembly 100. Housing 102 may include a lid 104 that is removable to allow access to an interior portion of housing 102. Lid 104 may be attached to housing 102, such as through a hinge, that allows lid 104 to pivot away from housing 102. Additionally or alternatively, lid 104 may be completely removed from housing 102. Housing 102 may include a hinged or removable rear panel to allow access to the interior, such as for servicing. Housing 102 may include a removable side panel to allow access to the interior, such as for servicing the interior components.

Warming assembly 100 may include an infeed platform 106 located at a front of housing 102. Infeed platform 106 may generally have a flat top surface 108 which is sized to allow a food product to be placed flat upon it, and acts as a table upon which the food product can be placed to slide upon as the food product is fed by hand into warming assembly 100. Surface 108 may be dimpled and may be coated with a stick resistant coating such as PTFE or the like to prevent the food product sticking or otherwise textured to allow the food product to easily slide on surface 108. Infeed platform 106 may have edges 110 to help contain the food product within infeed platform 106. Infeed platform 106 may be angled downward with respect to housing 102 to aid the food products sliding into housing 102. Infeed platform 106 may be detachable from housing 102, such as to allow for cleaning of infeed platform 106.

Warming assembly 100 may include an outfeed platform 112 located at the bottom of housing 102. Outfeed platform 112 may generally have a flat top surface 114 which is sized for a food product. Surface 114 may be coated with a stick resistant coating such as PTFE or the like to prevent food product sticking to the surface and allow the food product to easily slide on surface 144. Outfeed platform may be curved, as shown in FIG. 1, to aid food products moving away from housing 102. The curve may be oriented such that food products move away from the front of housing 102. Outfeed platform 112 may have sides 116 to help contain the food product within outfeed platform 112. Outfeed platform 112 may be detachable from housing 102, such as to allow for cleaning of outfeed platform 112.

Figure 2:
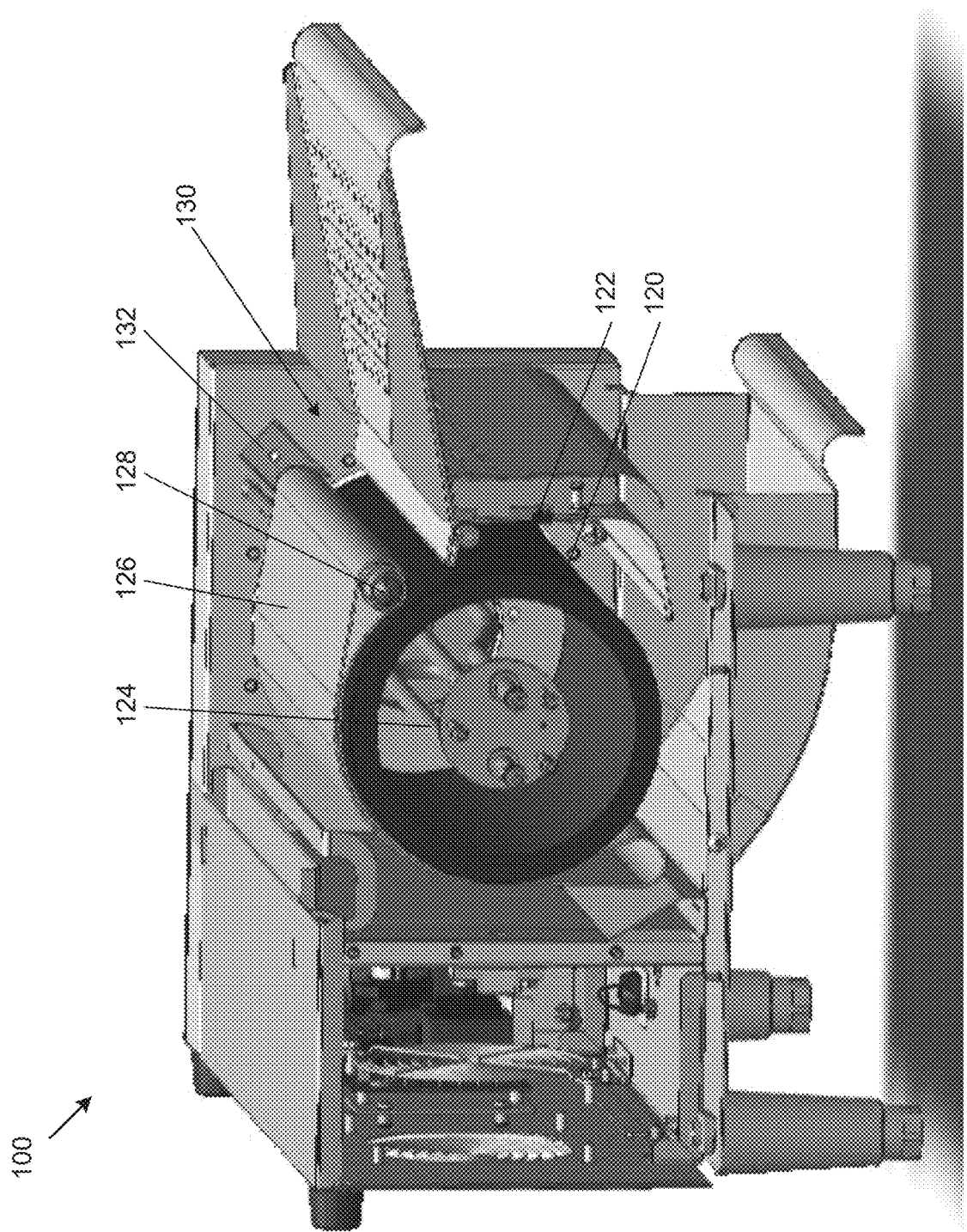
FIG. 2 is a partial isometric view of an embodiment of a warming assembly.

FIG. 2 is an isometric view of warming assembly 100 with portions of the housing 102 and other internal components removed to allow for a clearer view of the interior of warming assembly 100. Warming assembly includes heating drum 120 located within housing 102. Heating drum 120 may be cylindrically shaped with a curved exterior circumferential surface 122 that extends along the length of heating drum 120. Heating drum 120 may be metal, for example such as stainless steel, or may any other material that conducts heat. The exterior circumferential surface 122 of heating drum 120 may be coated with a stick resistant coating such as PTFE or the like to prevent the food product sticking to exterior circumferential surface 122. Heating drum 120 may be rotated by a motor (not shown), which may be a variable speed motor, located within housing 102. Heating drum 120 may rotate counterclockwise, as viewed from the perspective of FIG. 2.

A heater 124 may be located within heating drum 120. Heater 124 may include a generally U-shaped heating element that extends at least partially the length of heating drum 120, or any other type of heating element that is capable of increasing the temperature of heating drum 120. Heating drum 120 may rotate about heater 124 such that exterior circumferential surface 122 of heating drum 120 is heated. Exterior circumferential surface 122 may then transmit heat to a food product that is in contact with exterior circumferential surface 122.

Warming assembly 100 may include a belt 126 located within housing 102. Belt 126 may be a looped belt that may have a width approximately the same as the horizontal length of heating drum 120. Belt 126 may be looped around a belt roller 128, as described below. Belt 126 may be made of a flexible material, such as fabric, rubber, or plastic, for example. Belt 126 may be coated with a stick resistant coating such as PTFE or the like to prevent the food product sticking to it.

Belt 126 may be of sufficient weight such that it will hold down a food product onto the exterior circumferential surface 122 of heating drum 120. The weight of belt 126 may cause the food product to bend or flex and conform the shape of the food product to the shape of heating drum 120. Conforming the shape of food product to the shape of heating drum 120 may increase the contact area between the food product and exterior circumferential surface 122 of heating drum 120, which may increase the amount of heat transmitted from heating drum 120 to the food product. Consequentially, the food product may be warmed faster or more thoroughly than if belt 126 did not hold the food product against heating drum 120.

Belt 126 may serve to contact a food product should the food product separate from the exterior circumferential surface 122 of heating drum 120 and to direct the food product into contact with the exterior circumferential surface 122 of heating drum 120. This may improve the continuous nature of the heating of the food product by the heating drum 120. Belt 126 may act to maintain a food product in contact with the exterior circumferential surface 122 of heating drum 120 to provide more direct transmission of heat from the heating drum 120 to the food product.

The belt roller 128 may be located near an infeed opening 130 at the front of housing 102. Belt roller 128 may be substantially parallel to heating drum 120. Belt roller 128 may be a generally cylindrical shape. Belt roller 128 may have a length approximately the same as the horizontal length of heating drum 120. Belt roller 128 may rotate through the rotating action of belt 126 on belt roller 128, such as if the motion of a food product causes belt 126 to rotate, which in turn causes belt roller 128 to rotate.

Belt roller 128 may be located at approximately the two-o'clock position with respect to the end of heating drum 120 visible in FIG. 2, as shown in FIG. 2. Alternatively, belt roller 128 may be located anywhere from the twelve-o'clock position to the three-o'clock position with respect to the end of heating drum 120 visible in FIG. 2.

Belt roller 128 may be constrained by belt roller side rails 132 located at the two ends of belt roller 128. (Only one belt roller side rail 132 is shown in FIG. 2 for clarity.) Belt roller side rails 132 may allow belt roller 128 to rotate. Belt roller side rails 130 may be generally U-shaped brackets with a flat central portion and two short raised edges. Belt roller side rails 132 may form a channel that constrains the movement of belt roller 128 in a first direction and allows movement of belt roller 128 in a second perpendicular direction. Belt roller side rails 132 may be disposed at an angle within housing 102 such that the channel formed is perpendicular to the exterior circumferential surface 122 of heating drum 120, as shown in FIG. 2. Belt roller 128 may be free to float towards and away from the exterior circumferential surface 122 of heating drum 120, in a generally perpendicular direction, while belt roller 128 is within belt roller side rails 132. In this manner, gravity may cause belt roller 128 to rest against the exterior circumferential surface 122 of heating drum 120, but belt roller 128 may be free to move away from heating drum 120 if a food product was placed between belt 126 (which is looped around belt roller 128) and the exterior circumferential surface 122 of heating drum 120. The food product may cause belt roller 128 to move away from heating drum 120 when the food product is fed into infeed opening 130. The floating nature of belt roller 128 may accommodate varying thicknesses of food products, so that for thicker food products, the belt roller 128 (and belt 126 looped around belt roller 128) can move away from the heating drum 120. For thinner food products, the belt roller 128 (and belt 126 looped around belt roller 128) can move toward from the heating drum 120.

The weight of belt roller 128 may press the food product against heating drum 120. The rotation of the heating drum 120 may pull the food product upwards along the exterior circumferential surface 122 of heating drum 120 in a counterclockwise direction. The belt 126 will separate from the exterior circumferential surface 122 of heating drum 120 as the food product is pulled between belt 126 and the exterior circumferential surface 122 of heating drum 120.

The width of warming assembly 100 and its components, including housing 102, heating drum 120, belt 126, and belt roller 128, may vary from approximately 8 inches to about 24 inches. The width may be wide enough to accommodate two or three generally parallel lines of food products, such as tortillas, that are being fed into warming assembly 100. The heating drum 120 diameter may vary from approximately four to nine inches. The diameter of belt roller 128 may vary from approximately one half to four inches.

Figure 3:
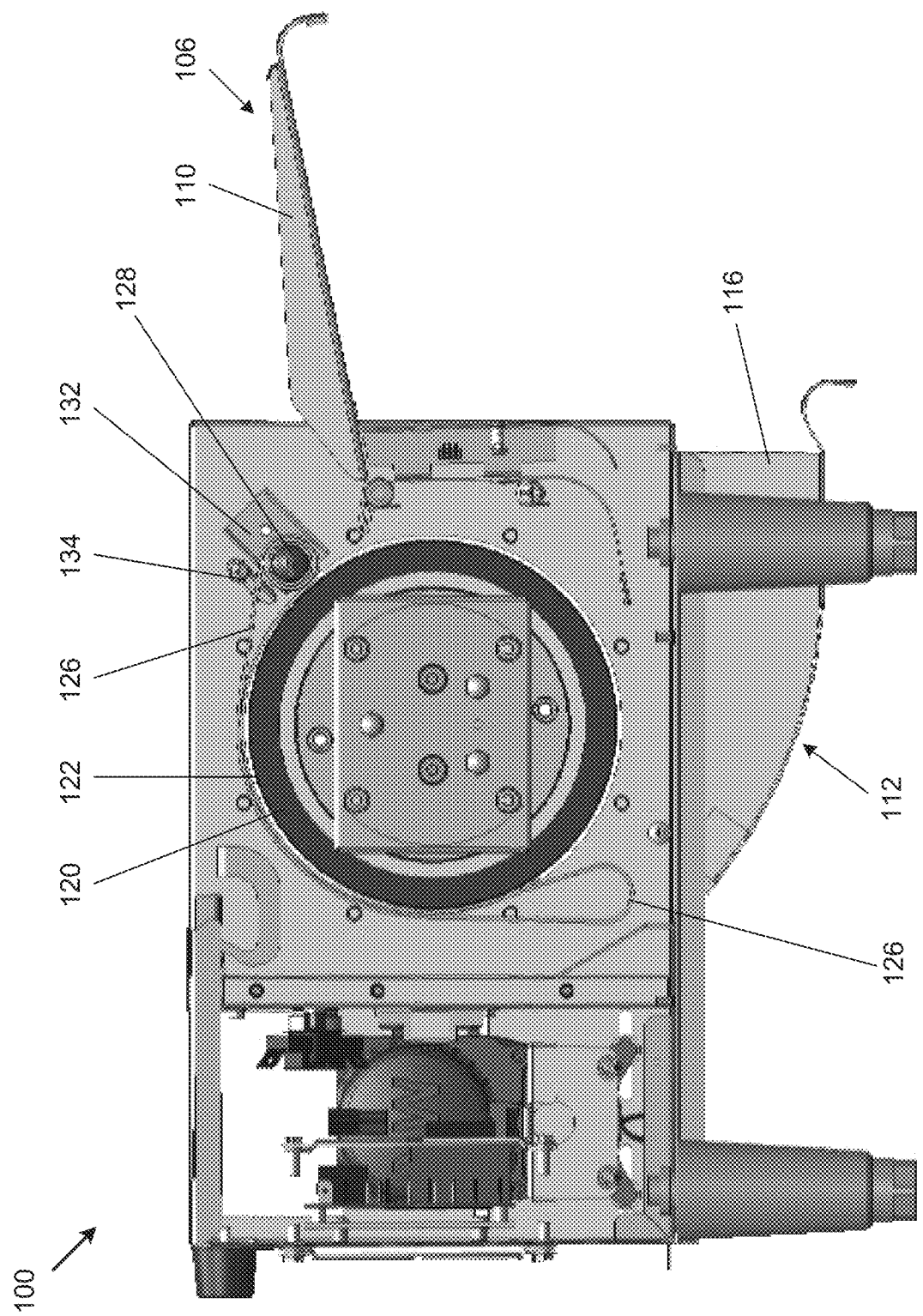
FIG. 3 is a partial side view of an embodiment of a warming assembly.

FIG. 3 is a side view of warming assembly 100 with portions of the housing 102 and other internal components removed to allow for a clearer view of the interior of warming assembly 100. FIG. 3 shows infeed platform 106 with edges 110, outfeed platform 112 with sides 116, heating drum 120, belt 126, belt roller 128, and belt roller side rails 132.

FIG. 3 shows that belt 128 may be in contact with the exterior circumferential surface 122 of heating drum 120. Belt 126 may be of sufficient length, when it is looped as shown in FIG. 3, such that belt 126 lays on, is draped on, or is in contact with approximately one half the circumference of exterior circumferential surface 122 of heating drum 120, as shown in FIG. 3. Belt 126 may lay on the top and back portions of the circumference of exterior circumferential surface 122 of heating drum 120 (where the back portion of heating drum 120 is in relation to the front infeed area of housing 102 and belt roller 128). Belt 126 may also be a shorter length such that is in contact with less than approximately one half the circumference of exterior circumferential surface 122 of heating drum 120. The length of belt 126 may also affect the weight of belt 126 and the force belt 126 places on a food product located between belt 126 and heating drum 120. A longer belt 126 may weigh more, which may apply more force to the food product than a shorter belt 126.

FIG. 3 shows belt guides 134. (Only one belt guide 134 is shown in FIG. 3 for clarity.) Belt guides 134 may help guide the travel belt 126 and ensure that belt 126 remains straight and centered on heating drum 120. Belt guides 134 may be brackets positioned on the interior of housing 102 such that only a top half of the looped belt 126 travels through belt guides 134, as shown in FIG. 3.

In operation, warming assembly 100 may heat a food product that is fed into infeed opening 130 at the front of housing 102. The food product may be placed on infeed platform 106 and slid into infeed opening 130. The food product may contact the exterior circumferential surface 122 of heating drum 120 and be pulled into housing 102 by the counterclockwise rotation of heating drum 120. The food product may be pulled between belt 126 and heating drum 120 as the food product travels along with the rotation of heating drum 120. Belt 126 may rotate in a clockwise direction (as viewed in FIG. 3) due to the friction with the top of the food product as the food product travels with the rotation of heating drum 120. The weight of belt 126 may hold the food product down against the exterior circumferential surface 122 of heating drum 120 along the top and back portions of heating drum 120 where belt 126 is in contact with the exterior circumferential surface 122 of heating drum 120, as shown in FIG. 3. The food product may be heated by heating drum 120 as the food product is in contact with the exterior circumferential surface 122 of heating drum 120. The food product may separate from the exterior circumferential surface 122 of heating drum 120 when the food product reaches the area where belt 126 is no longer in contact with the exterior circumferential surface 122 of heating drum 120. The area where belt 126 is no longer in contact with the exterior circumferential surface 122 of heating drum 120 is approximately at an eight-o'clock position with respect to the end of heating drum 120 visible in FIG. 3. After the food product separates from the exterior circumferential surface 122 of heating drum 120, the food product may fall onto outfeed platform 112 and slide along curved surface 114 to be discharged from warming assembly 100.

Accordingly, the food product travels along the circular path of the exterior circumferential surface 122 of heating drum 120. The malleable and flexible composition of the food product heated by warming assembly 100, allows the food product to bend along the curvature of the heating drum 120 and to travel with the heating drum 120 without sliding. Preferably the food product maintains the same area of contact against the heating drum 120 throughout its path from leaving the belt roller 128. The pressure applied by belt 126 against the food product helps to keep the food product in the same position relative to the heating drum 120 as the heating drum 120 rotates.

Warming assembly 100 may include a control and display panel 118 located at the front of housing 102, as shown in FIG. 1, to control the operation of warming assembly 100. Temperature sensors (not shown), such as high temperature switches, may be located at specific locations, such as in the back area of heating drum 120.

While certain embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. A food warmer assembly comprising:
   a housing;
   a cylindrically-shaped heating drum rotatably mounted within the housing, the cylindrically-shaped heating drum comprising an outer circumferential surface;
   a belt roller rotatably mounted within the housing and disposed substantially parallel to the cylindrically-shaped heating drum, wherein the belt roller is movably spaced apart from the outer circumferential surface; and
   a belt looped around the belt roller, wherein the belt is disposed over a top portion of the outer circumferential surface and a back portion of the outer circumferential surface, wherein rotation of the cylindrically-shaped heating drum is configured to move a food product within the housing at least partially in contact with the outer circumferential surface.

2. The food warmer assembly of claim 1, further comprising a belt roller side rail that forms a channel oriented perpendicularly to the outer circumferential surface, wherein the belt roller is disposed within the channel.

3. The food warmer assembly of claim 1, further comprising two belt guides that at least partially constrain a top half of the belt that is looped around the belt roller.

4. The food warmer assembly of claim 1, wherein the belt is at least as long as one third a circumference of the outer circumferential surface.

5. The food warmer assembly of claim 1, wherein the belt is in contact with at least one third of the outer circumferential surface when there is no food product located in the food warmer assembly.

6. The food warmer assembly of claim 1, wherein the belt is looped only around the belt roller.

7. The food warmer assembly of claim 1, wherein the belt roller is spaced apart from the outer circumferential surface such that a space is formed between the belt roller and the outer circumferential surface and such that a food product can be located in the space.

8. The food warmer assembly of claim 1, further comprising an inlet tray.

9. The food warmer assembly of claim 1, further comprising an outlet tray.

10. The food warmer assembly of claim 1, further comprising a high-temperature switch disposed within the housing on a side of the cylindrically-shaped heating drum substantially opposite the belt roller.

11. The food warmer assembly of claim 1, further comprising a motor to rotate the cylindrically-shaped heating drum.

12. The food warmer assembly of claim 1, further comprising a heating element located within the cylindrically-shaped heating drum configured to warm the outer circumferential surface.

13. The food warmer assembly of claim 1, wherein the housing comprises a side disposed at one end of the cylindrically-shaped heating drum that is configured to open to allow access to the one end of the cylindrically-shaped heating drum.

14. The food warmer assembly of claim 1, wherein the housing comprises a lid that is movable to allow access to the cylindrically-shaped heating drum.

15. The food warmer assembly of claim 1, wherein the belt has a width that has a magnitude that is substantially identical to a magnitude of a width of the cylindrically-shaped heating drum.

16. The food warmer assembly of claim 1, wherein the belt roller has a width that has a magnitude that is substantially identical to a magnitude of a width of the cylindrically-shaped heating drum.

17. The food warmer assembly of claim 1, wherein the belt has a weight that holds down the food product onto the outer circumferential surface.

18. The food warmer assembly of claim 1, wherein the weight of the belt is sufficient to conform a shape of the food product to a shape of the cylindrically-shaped heating drum.

19. The food warmer assembly of claim 1, wherein motion of the food product causes the belt to rotate.

20. The food warmer assembly of claim 2, wherein the belt roller translationally moves within and along a longitudinal axis of the channel.

21. A method for warming a food product, the method comprising:
    inserting a food product between a belt and a cylindrically-shaped heating drum, wherein the belt is looped around a rotatable belt roller that is movable spaced apart from the cylindrically-shaped heating drum;
    rotating the heating drum to pull the food product along a top exterior circumferential surface of the cylindrically-shaped heating drum;
    moving the food product along the top exterior circumferential surface as the cylindrically-shaped heating drum rotates while the food product remains disposed between the top exterior circumferential surface and an exterior surface of the belt;
    holding the food product in direct contact with the top exterior circumferential surface by a weight of the belt causing the exterior surface of the belt to maintain contact with the food product;
    heating an interior of the cylindrically-shaped heating drum with a heater; and
    warming the food product as it contacts the top exterior circumferential surface.

22. The method for warming a food product of claim 21, further comprising adjusting spacing between the belt roller and the cylindrically-shaped heating drum by translationally moving the belt roller within side rails that include slots oriented perpendicularly to the top exterior circumferential surface.

23. The method for warming a food product of claim 21, further comprising separating the food product from the top exterior circumferential surface at a point where the belt separates from the top exterior circumferential surface.

\* \* \* \* \*